Jan. 15, 1935.  O. R. SKELTON  1,987,716

TORQUE TRANSMITTING APPARATUS

Filed Sept. 25, 1933

INVENTOR.
OWEN R. SKELTON.
BY
ATTORNEYS.

Patented Jan. 15, 1935

1,987,716

UNITED STATES PATENT OFFICE

1,987,716

TORQUE TRANSMITTING APPARATUS

Owen R. Skelton, Grosse Pointe Farms, Mich., assignor to Chrysler Corporation, Detroit, Mich., a corporation of Delaware Application September 25, 1933, Serial No. 690,781

3 Claims. (Cl. 74—311)

This invention relates to improved torque transmitting mechanism of the character used in vehicle differentials and particularly to an improved assembly of the ring gear, pinion and shaft, and cage thereof on which such parts of a differential are mounted.

The main objects of the invention are to provide a direct coupling between the ring gear and pinion shaft of a differential for directly transmitting torque from one to the other; to provide a coupling of this character which relieves the bolts, conventionally used to secure the ring gear to the differential cage, from torque load and which therefore reduces the required number of such bolts; to provide a coupling between the opposite ends of the pinion shaft and the ring gear of torque transmitting mechanism of this kind which may be relied upon to hold the pinion shaft against turning relative to the cage and against displacement relative thereto; to provide a differential ring gear and pinion shaft assembly in which are eliminated the pins and similar elements heretofore required to hold the pinion shaft of a differential in place and against turning relative to the cage; to provide differential parts of this character that can be conveniently and economically assembled in a somewhat self-retaining manner; and to eliminate the necessity of inserting and removing pins and similar elements from registering openings in the cage and pinion shaft of a differential during assembling and disassembling the parts thereof.

An illustrative embodiment of the invention is shown in the accompanying drawing, in which.

Figure 1:
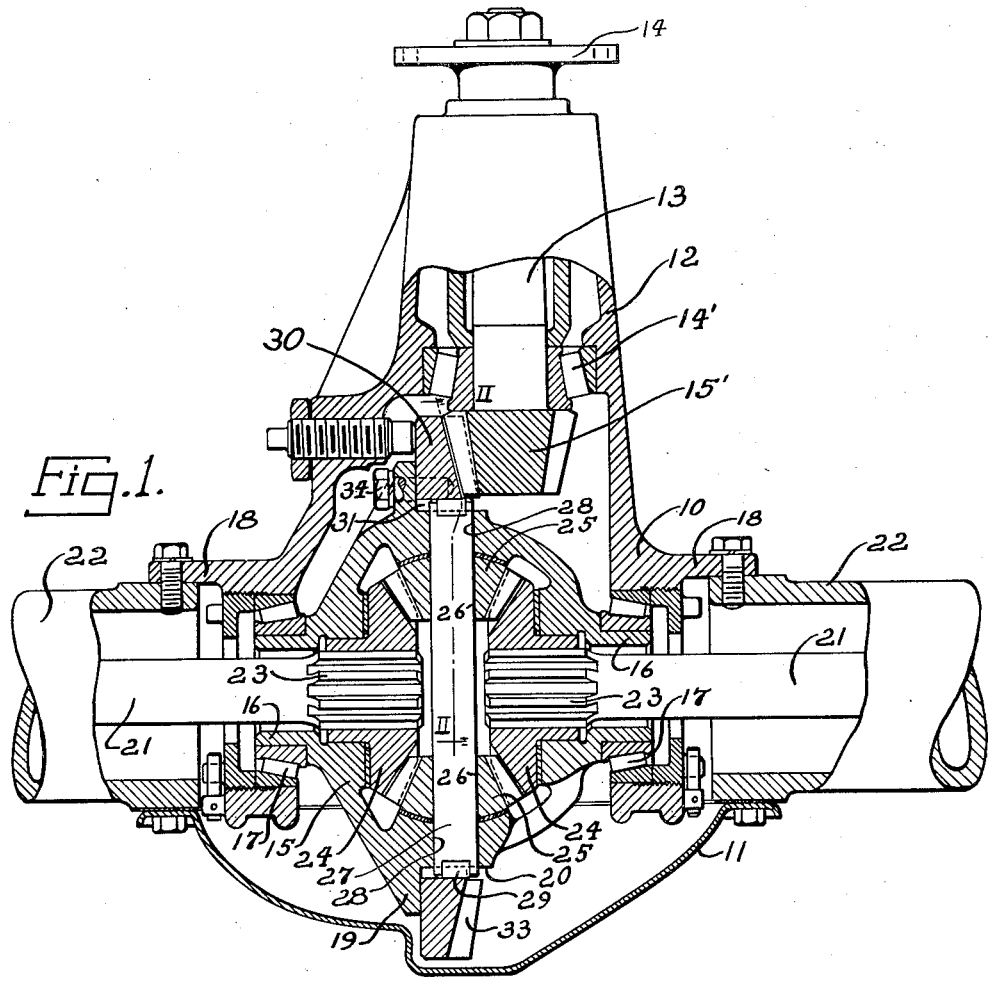
Fig. 1 is a plan view of a vehicle differential, partly in section, and showing portions of the differential housing removed to disclose the underlying structure.
Figure 2:
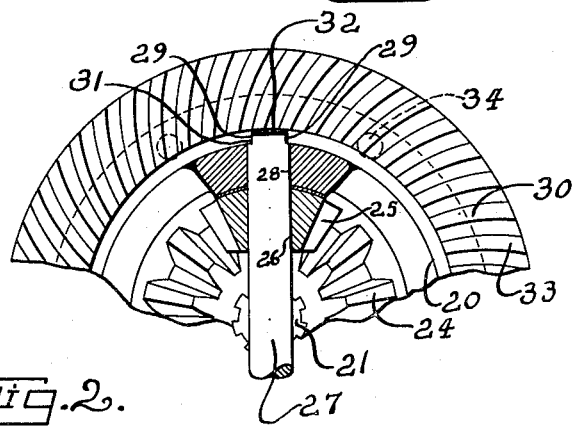
Fig. 2 is a fragmentary substantially vertical sectional view taken on the line II—II of Fig. 1.

The torque transmitting mechanism shown in the drawing is a differential of the type used to propel the driving road wheels of a vehicle. All of the features of my invention may, however, be used to advantage in any torque transmitting apparatus having a rotatable structure containing pinions and provided with a pinion shaft and ring gear, regardless of the purpose for which such mechanism is employed. The differential illustrated includes a substantially T-shaped housing 10 having an opening intermediate its opposite branch portions provided with a closure 11. Journaled in the intermediate branch 12 of the T-shaped housing 10 is a shaft 13 which is provided at its outer end with a coupling 14 for connecting with the propeller shaft (not shown) of a vehicle. The shaft 13 is rotatably supported by bearings 14' located adjacent its inner end on which is rigidly fixed a beveled ring gear pinion 15'.

Disposed between the three branches of the T-shaped housing 10 is a rotatable cage 15 having trunnions 16 which are rotatably mounted in bearings 17 confined in the inner ends of the opposite branches 18 of the housing 10. The cage 15 has a radial flange 19 and an adjacent peripheral seat 20 which is concentrically formed with respect to the axis of rotation of the cage. Axles 21 extend through the opposite branches 18 of the housing and through axle housings 22 attached to the latter and into the interior of the cage 15. The inner ends of the axles 21 are provided with splines 23 on which beveled differential gears 24 are mounted. The beveled gears 24 are operatively connected together in a conventional manner by pinions 25 mounted within the differential cage 15.

The pinions 25 are provided with aligned passages 26 for receiving a pinion shaft 27. The pinion shaft 27 extends through the apertures 26 of the pinions 25 and through registering apertures 28 formed at diametrically opposite locations in the peripheral portion 20 of the differential cage 15. The end portions of the shaft protrude beyond the peripheral seat 20 of the cage 15 and are provided with opposite flat side faces 29.

Mounted on the peripheral face 20 of the cage 15 is a ring gear 30 having open end notches 31 in its inner periphery for receiving the protruding end portions of the pinion shaft 27. These notches have substantially flat side portions for engaging the flat side portions 29 on the pinion shaft 27 so as to securely hold the latter against turning relative to the cage. The extremities of the shaft 27 are disposed in close fitting relationship to the outer walls 32 of the notches 31 so as to hold the shaft 27 against displacement from the cage while the ring gear 30 is in place. The ring gear 30 has teeth 33 which mesh with the teeth of the ring gear pinion 15', as illustrated in Fig. 1, and it is held against axial displacement with respect to the cage 15 by bolts 34 extending through apertures in the radial flange 19 of the cage and threaded in registering apertures formed in the ring gear. The protruding ends of the shaft 27 directly hold the ring gear 30 against rotation relative to the cage 15 and they also serve to directly apply torque from one to the other of these members.

In assembling my improved torque transmitting apparatus the gears 24 and pinions 25 are arranged in the relation shown in Fig. 1 and the shaft 20 is inserted through the registering apertures 26 and 28 of the pinions 25 and cage 15, respectively, before the ring gear 30 is placed in its desired position. Then the ring gear 30 is moved axially over the protruding ends of the shaft 27, which are accommodated by the notches of the ring gear, until the latter abuts the side face of the radial flange 19, against which it is firmly drawn by the bolts 34. With this structure the ring gear and ends of the pinion shaft are directly coupled together in a substantially self-locating relation and without the aid of pins or similar elements which are difficult to assemble and subject to unintentional displacement during operation of the mechanism.

Although but one specific embodiment of my invention is herein shown and described, it will be understood that various changes in the size, shape and arrangement of parts may be made without departing from the spirit of my invention, and it is not my intention to limit its scope other than by the terms of the appended claims.

What I claim is:

1. Torque transmitting apparatus including a supporting structure, a cage rotatably mounted thereon having spaced coaxially aligned apertures, driven members extending into said cage having gears on their inner ends, pinions in said cage having passages aligned with the apertures of the cage and having teeth meshed with said gears, a shaft rotatably supporting said pinions, said shaft being insertable by movement in the direction of its longitudinal axis through the apertures of said cage and passages of said pinions and having end portions protruding beyond said cage, a ring gear detachably securable to said cage having notches registering with the apertures thereof for receiving the protruding ends of said shaft, said ring gear being movable axially of said cage for bringing the notches thereof into interfitting relationship with the protruding ends of said shaft.

2. Torque transmitting apparatus including a supporting structure, a cage rotatably mounted thereon having a peripheral reference surface and spaced coaxially aligned apertures extending through said reference surface, driven members extending into said cage having gears on their inner ends, pinions in said cage having passages aligned with the apertures of the cage and having teeth meshed with said gears, a shaft rotatably supporting said pinions, said shaft being insertable by movement in the direction of its longitudinal axis through the apertures of said cage and passages of said pinions and having end portions protruding beyond said cage, a ring gear detachably securable to said cage and having notches registering with the apertures thereof for receiving the protruding ends of said shaft, said ring gear being movable axially of said cage on said peripheral reference surface for piloting said ring gear and cage into concentric relationship and for bringing the notches thereof into interfitting engagement with the protruding ends of said shaft.

3. Torque transmitting apparatus including a supporting structure, a cage rotatably mounted thereon having spaced coaxially aligned apertures, said cage being provided with a peripheral flange and an adjacent concentric seat portion, said seat portion being concentric with said cage, driven members extending into said cage, interconnected gearing for transmitting torque to said driven members including pinions having spaced coaxial passages aligning with the apertures of said cage, a shaft insertable through said aligned apertures and passages rotatably supporting said pinions and having end portions protruding beyond said cage, a ring gear detachably securable to said cage having notches registering with the apertures thereof, said ring gear being movable axially of said cage upon said seat portion and in abutting relationship with said peripheral flange, and a shaft in driving engagement with said ring gear.

OWEN R. SKELTON.